No. 797,266. PATENTED AUG. 15, 1905.
M. A. CONKLIN.
STRAINER.
APPLICATION FILED NOV. 10, 1904.

Witnesses
M. A. Schmidt
Geo. E. Few

Inventor
Mary A. Conklin.
by Milo B. Stevens & Co.
Attorneys

UNITED STATES PATENT OFFICE.

MARY A. CONKLIN, OF JOLIET, ILLINOIS.

STRAINER.

No. 797,266.  Specification of Letters Patent.  Patented Aug. 15, 1905.

Application filed November 10, 1904. Serial No. 232,236.

*To all whom it may concern:*

Be it known that I, MARY A. CONKLIN, a citizen of the United States, residing at Joliet, in the county of Will and State of Illinois, have invented new and useful Improvements in Strainers, of which the following is a specification.

This invention is an improved strainer for coffee and tea pots, and has for its object to provide an auxiliary strainer which can be placed or removed, as desired, and which can be readily taken apart and cleaned when removed.

The invention is illustrated in the accompanying drawings, in which—

Figure 1:
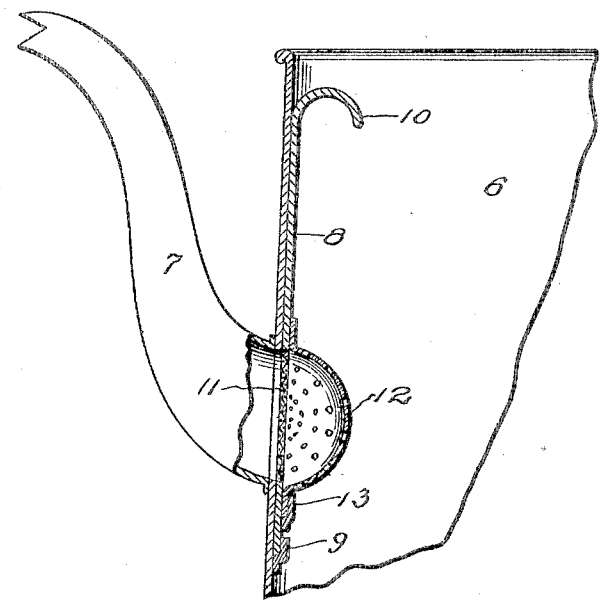
Figure 2:
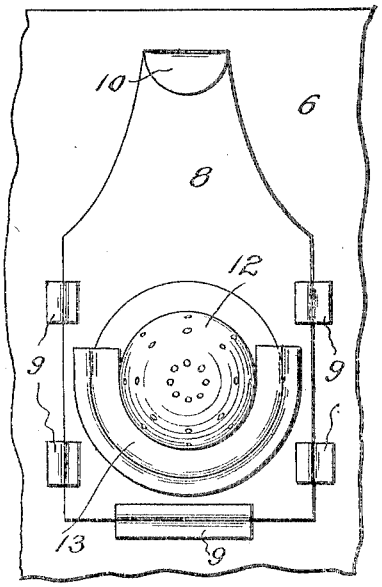

Figure 1 is a sectional view of the strainer applied to a pot. Fig. 2 is an inside view.

Referring specifically to the drawings, 6 indicates the coffee or tea pot, and 7 the spout.

The strainer comprises a plate 8, which is slidable under clips 9, projecting from the inside wall of the pot. At the top the plate has an outturned finger-piece 10, so that it can be readily taken hold of and removed when desired.

11 indicates a strainer of fine-woven wire covering an opening in the plate which registers with the entrance to the spout when the plate is in position.

12 indicates a coarse strainer comprising a cupped perforated piece of metal. This is held by a semicircular flange or ledge 13, which is secured to the plate 8 and is spaced therefrom at the inner edge, forming a recess therebetween into which the rim of the cupped strainer 12 fits. The fit is tight enough to normally hold the strainer in place; but it may be slipped out when desired.

When the parts are to be cleaned, the plate 8 is pulled out of the pot and the strainer 12 separated therefrom, so any matter collected between the two strainers can be washed off.

What I claim as new, and desire to secure by Letters Patent, is—

A strainer for pots, comprising a plate, removably held against the wall of the pot, and having an outturned finger-piece at the top and an opening covered by a fine screen opposite the entrance to the spout, a flange projecting from the inner side of the plate under said opening, and a removable cupped coarse screen the rim of which fits under said flange.

In testimony whereof I have signed my name to this specification in the presence of two subscribing witnesses.

MARY A. CONKLIN.

Witnesses:
WM. F. BARNHARDT,
ROSALIA BARHARDT.